Dec. 6, 1932.  C. P. CHAMBERLIN  1,889,774
CONSTRUCTION OF ANNULAR OBJECTS, SUCH AS TIRE COVERS
Original Filed June 8, 1932
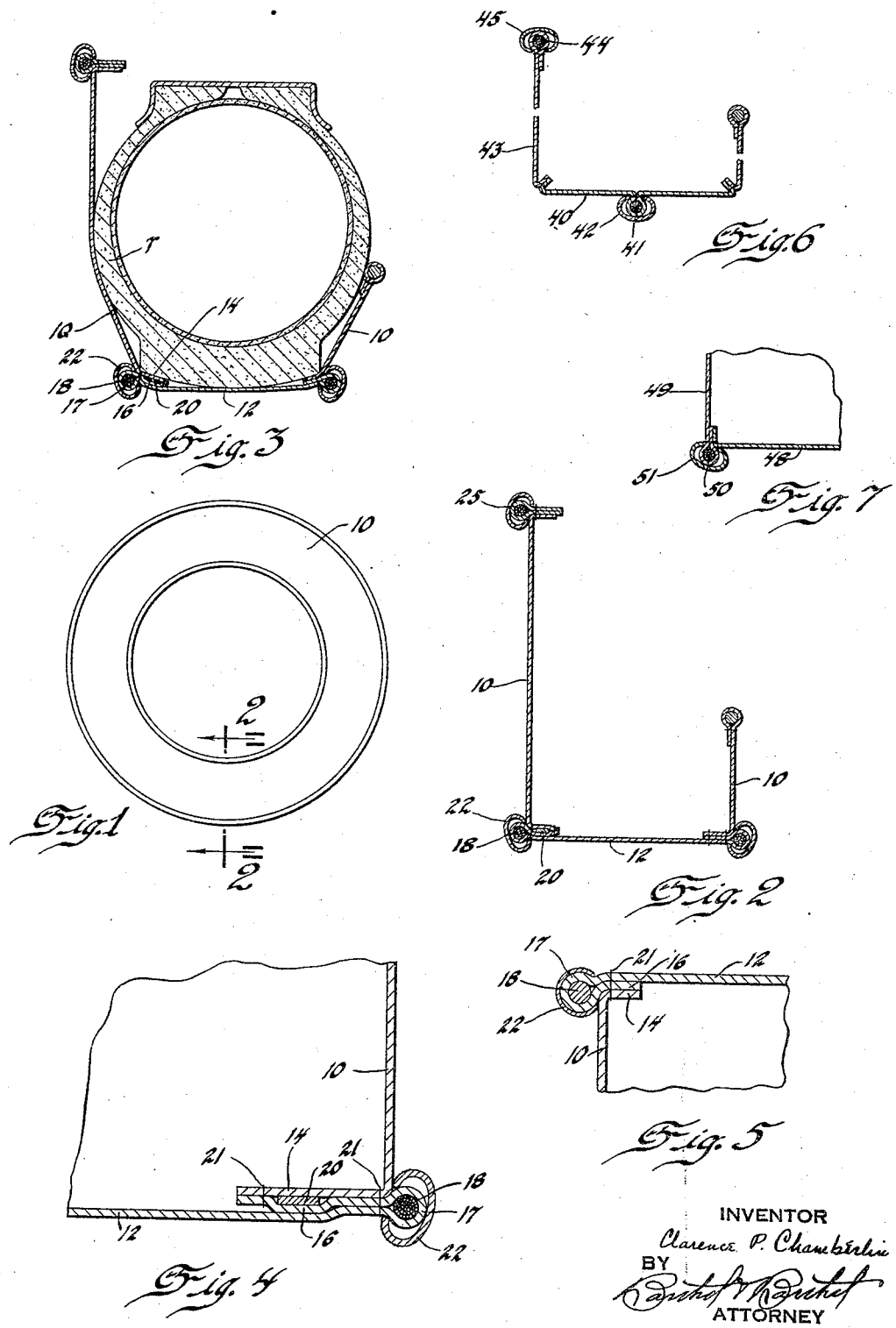
INVENTOR
Clarence P. Chamberlin
BY
ATTORNEY Patented Dec. 6, 1932

1,889,774

UNITED STATES PATENT OFFICE

CLARENCE P. CHAMBERLIN, OF DETROIT, MICHIGAN

CONSTRUCTION OF ANNULAR OBJECTS, SUCH AS TIRE COVERS

Original application filed June 8, 1932, Serial No. 616,137. Divided and this application filed August 8, 1932. Serial No. 627,829.

This invention relates to novel details of construction of annular devices such as covers for wire coils, tires, etc.

One object of the invention is to provide a novel construction employing a molding.

Still further objects will readily appear from the following detailed description of embodiments of the invention and from the appended drawing in which Figure 1 shows an annular cover, in face view;

Fig. 2 shows the same in cross section;

Fig. 3 shows the same in cross section, applied to a tire or the like;

Figs. 4 and 5 are enlarged detailed sectional views;

Figs. 6 and 7 are detailed sectional views of other constructions.

The device

The device shown in Figs. 1-5 of the drawing, which may well be used as a cover for annular objects such as coils of wire, tires, etc. includes a planar side wall 10, which may be annular or circular and which has a circular or substantially circular outer edge, and also a cylindrical top wall 12, connected and secured to the side wall. As shown, the elements of the cylinder of the top wall are perpendicular to the planar side wall.

The side wall is provided with an inwardly turned flange portion 14 which lies adjacent a retroverted portion 16 projecting inwardly from the folded over edge 17 of the top wall. In this edge is disposed a bead forming annular member 18. In the device of Figs. 3 and 4 the member 18 is of rope, or the like, and is not form sustaining, that is to say it does not of itself retain its annular shape. In the device of Fig. 5 the member 18 is of wire or the like and is form sustaining, retaining its annular shape without assistance.

When a rope or the like comprises the member 18, as in the device of Figs. 3 and 4, the annular corner may be, and in some constructions preferably is, provided with an annular wire ring 20 disposed between the portions 14 and 16 of the cover, and having an inherent tendency to expand and tension the walls 10 and 12.

If desired, where the device has two side walls, a ring 20 may be provided for both annular corners, or may be provided for one only of the annular corners, preferably for the annular corner which is most often presented to view.

Lines of stitching 21 are provided to secure the aforementioned parts in juxtaposition, as indicated.

For stiffening, ornamenting, reinforcing, binding, etc., the edge or corner of the device, a C cross section molding 22 may be applied to the beaded edge 17, as shown. The molding preferably encompasses the bead of edge 17 in such a manner that it projects forwardly from the top wall, rather than, as might be expected, radially outwardly. This is clearly brought out in Fig. 4.

Where the member 18 is not form sustaining, the molding 22 should be of fairly heavy cross section, since it must have sufficient rigidity to enable it to retain its annular shape without assistance from the member 18. Where the member 18 is of wire or the like, the molding may be relatively light in cross section, and may be considered as little more than a plating.

Further, in some cases, as in Fig. 4, the molding may be applied to the beaded edge 17 in such a manner that, though non-removable from the edge, it is loose thereon. This feature permits relative circumferential movement between the molding and the edge 17 and prevents puckering etc. of the material near the edge.

In other cases, as in Fig. 5, the molding may be clinched onto the bead tightly, in a manner to prevent relative movement between the molding and the edge.

Still further, the molding is applied to the cover in such a manner that, though contracted to the diameter of the rope 18 to which it is applied, it possesses an inherent tendency to expand to a greater diameter. This prevents the tendency of the molding, when applied, to wave itself out of a true plane.

Still further, the molding may be polished, plated or coated, as desired, though, for purposes of economy, it is preferred to polish or plate only the forward part or wall of the molding, leaving unpolished those portions thereof behind the beaded edge of the device.

Still further, while the device is shown in use as a cover for a tire T, it is clearly understood that the device may be used as a cover for other annular or substantially annular objects. For example the device may be used as a cover for wire coils. Other uses might also be suggested.

In Fig. 6, there is shown a cover or the like wherein the top wall 40 has a central bead 41 provided with a molding 42, projecting radially outwardly, and wherein the inner annular edge of the side wall 43 has a radially inwardly projecting bead 44 on which is a radially inwardly disposed molding 45.

In Fig. 7 there is shown a corner construction, between top wall 48 and side wall 49 wherein bead 50 projects radially outwardly and is covered by a molding 51.

This application is a division of my copending application Serial Number 616,137, filed June 8, 1932.

Now having described my invention, and embodiments thereof, it will be observed that the same is not to be limited to the specific details shown, but only by the scope of the claims which follow.

What I claim is:

1. In an annular corner construction for annular objects of pliable material, the combination of a planar side wall, a cylindrical top wall, an annular bead adjacent the annular corner of said walls and firmly anchored with respect to said walls, and an annular C cross section molding externally encompassing and supported on said bead by having its edges turned in over said bead, the molding being loose enough with respect to the bead, as not to bind thereon and thereby cause puckering of pliable wall parts to which said bead is anchored, the molding also being loose enough thereon so as to permit relative circumferential movement between the molding and the bead.

2. In combination, pliable annular wall parts, means forming an annular bead anchored with respect thereto, and an annular, C cross section, molding externally encompassing said bead and supported thereon by having its edges turned in thereover, the molding being loose enough with respect to the bead, as not to bind thereon and thereby cause puckering of pliable wall parts to which said bead is anchored, the molding also being loose enough thereon so as to permit relative circumferential movement between the molding and the bead.

3. In combination, pliable annular wall parts, means forming an annular bead anchored with respect thereto, and an annular, C cross section, molding externally encompassing said bead and supported thereon by having its edges turned in thereover, the molding being loose enough with respect to the bead, as not to bind thereon and thereby cause puckering of pliable wall parts to which said bead is in anchored, the molding also being loose enough thereon so as to permit relative circumferential movement between the molding and the bead, the molding, though contracted to the diameter of the bead, having an inherent tendency to expand to a greater diameter.

4. In an annular corner construction for annular objects of pliable material, the combination of a planar side wall, a cylindrical top wall, an annular bead adjacent the annular corner of said walls and firmly anchored with respect to said walls, and an annular C cross section molding externally encompassing and supported on said bead by having its edges turned in over said bead, the molding being loose enough with respect to the bead, as not to bind thereon and thereby cause puckering of pliable wall parts to which said bead is anchored, the molding also being loose enough thereon so as to permit relative circumferential movement between the molding and the bead, the molding, though contracted to the diameter of the bead, having an inherent tendency to expand to a greater diameter.

In testimony whereof I affix my signature.

CLARENCE P. CHAMBERLIN.